United States Patent
Koch, III et al.

(10) Patent No.: US 10,787,386 B2
(45) Date of Patent: Sep. 29, 2020

(54) ANTIMICROBIAL-ANTIREFLECTIVE ARTICLES AND METHODS FOR MAKING THE SAME

(71) Applicant: CORNING INCORPORATED, Corning, NY (US)

(72) Inventors: Karl William Koch, III, Elmira, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 149 days.

(21) Appl. No.: 15/756,647

(22) PCT Filed: Aug. 30, 2016

(86) PCT No.: PCT/US2016/049388
§ 371 (c)(1),
(2) Date: Mar. 1, 2018

(87) PCT Pub. No.: WO2017/040467
PCT Pub. Date: Mar. 9, 2017

(65) Prior Publication Data
US 2018/0251399 A1 Sep. 6, 2018

Related U.S. Application Data

(60) Provisional application No. 62/213,220, filed on Sep. 2, 2015.

(51) Int. Cl.
*C03C 17/42* (2006.01)
*B32B 7/023* (2019.01)
(Continued)

(52) U.S. Cl.
CPC .............. *C03C 17/42* (2013.01); *A01N 55/00* (2013.01); *A01N 59/00* (2013.01); *A01N 59/14* (2013.01);
(Continued)

(58) Field of Classification Search
CPC .. G02B 1/11; G02B 1/111–1/118; G02B 1/12; G02B 1/14; G02B 1/18;
(Continued)

(56) References Cited

U.S. PATENT DOCUMENTS 5,043,789 A    8/1991   Linde et al.
6,146,688 A   11/2000   Morgan et al.
(Continued)

FOREIGN PATENT DOCUMENTS

CN    102533112 A    7/2012
EP      1270527 A1    1/2003
(Continued)

OTHER PUBLICATIONS

Machine translation of JP2010-139964. Retrieved Sep. 23, 2019.*
(Continued)

*Primary Examiner* — Prashant J Khatri

(57) ABSTRACT

Described herein are antimicrobial articles having improved antimicrobial efficacy and antireflective properties. Further described are methods of making and using the improved articles. The antimicrobial articles generally include an antimicrobial element and an antireflective element. The antireflective element, in some cases, can be disposed directly on a glass, glass-ceramic or ceramic substrate and the antimicrobial element is disposed on the antireflective element. The article can exhibit a reflectance of about 4% or less (and less than 1% in some cases) in the range of about 425 nm to about 725 nm. Further, the article can be characterized with an antimicrobial efficacy by exhibiting at least
(Continued)

a 2 log reduction in a concentration of at least *Staphylococcus aureus*, *Enterobacter aerogenes*, and *Pseudomonas aeruginosa* bacteria under a Modified EPA Copper Test Protocol.

14 Claims, 6 Drawing Sheets

(51) Int. Cl.
    *C08G 77/26* (2006.01)
    *G02B 1/18* (2015.01)
    *A01N 55/00* (2006.01)
    *A01N 59/00* (2006.01)
    *A01N 59/14* (2006.01)
    *A01N 59/16* (2006.01)
    *A01N 59/20* (2006.01)
    *C09D 5/14* (2006.01)
    *C09D 183/08* (2006.01)
    *G02B 1/115* (2015.01)

(52) U.S. Cl.
    CPC ............ *A01N 59/16* (2013.01); *A01N 59/20* (2013.01); *B32B 7/023* (2019.01); *C08G 77/26* (2013.01); *C09D 5/14* (2013.01); *C09D 183/08* (2013.01); *G02B 1/115* (2013.01); *G02B 1/18* (2015.01); *C03C 2217/734* (2013.01); *C03C 2217/90* (2013.01); *C03C 2218/111* (2013.01)

(58) Field of Classification Search
    CPC ....... C03C 17/00–17/44; C09D 5/1675; C09D 5/14; C09D 183/00–183/16; B32B 7/00–7/14; B32B 17/10165–17/10238
    See application file for complete search history.

(56) References Cited

U.S. PATENT DOCUMENTS

| | | |
|---|---|---|
| 6,572,926 B1 | 6/2003 | Morgan et al. |
| 7,041,363 B2 | 5/2006 | Krohmer et al. |
| 7,851,653 B2 | 12/2010 | Getman et al. |
| 7,858,141 B2 | 12/2010 | Getman et al. |
| 7,919,004 B2 | 4/2011 | Weiser et al. |
| 8,741,437 B2 | 6/2014 | Pilloy et al. |
| 2002/0090739 A1 | 7/2002 | Laguitton |
| 2008/0045491 A1 | 2/2008 | Fitchmun |
| 2008/0063728 A1 | 3/2008 | Fechner et al. |
| 2008/0145625 A1 | 6/2008 | Schumacher et al. |
| 2009/0142568 A1 | 6/2009 | Dejneka et al. |
| 2011/0140004 A1 | 6/2011 | Decroupet et al. |
| 2011/0305898 A1 | 12/2011 | Zhang et al. |
| 2012/0034435 A1 | 2/2012 | Borrelli et al. |
| 2012/0061248 A1 | 3/2012 | Zhu et al. |
| 2013/0135741 A1* | 5/2013 | Lee .......... G02B 1/11 359/580 |
| 2014/0004334 A1* | 1/2014 | Kalyankar .......... G02B 1/115 428/312.6 |
| 2014/0322547 A1 | 10/2014 | Petzold et al. |
| 2015/0015959 A1 | 1/2015 | Lee et al. |
| 2015/0044482 A1* | 2/2015 | Lee .......... G02B 1/115 428/426 |
| 2015/0137049 A1 | 5/2015 | Mittal et al. |

FOREIGN PATENT DOCUMENTS

| | | | |
|---|---|---|---|
| EP | 2511944 A1 | 10/2012 | |
| JP | 11052105 A | 2/1999 | |
| JP | 11086757 A | 3/1999 | |
| JP | 2000053451 A | 2/2000 | |
| JP | 2007039392 A | 2/2007 | |
| JP | 2010125719 A | 6/2010 | |
| JP | 2010138025 A | 6/2010 | |
| JP | 2010139964 A * | 6/2010 | |
| WO | 2006048276 A1 | 5/2006 | |
| WO | WO-2011132020 A1 * | 10/2011 | ............ C07F 7/1892 |
| WO | 2011149998 A1 | 12/2011 | |
| WO | 2012122206 A1 | 9/2012 | |
| WO | 2012135294 A2 | 10/2012 | |

OTHER PUBLICATIONS

Di Nunzio et al. "Silver containing bioactive glasses prepared by molten salt ion-exchange". Journal of the European Ceramic Society, 24, (2004); pp. 2935-2942.*

Dobrowolski, J.A. (eds. Bass et al.). "Chapter 42: Optical Properties of Films and Coatings". Handbook of Optics, vol. 1: Fundamentals, Techniques, and Design, (1995); pp. 42.3-42.130.*

Majumdar et al. "Antimicrobial activity of polysiloxane coatings containing quaternary ammonium-functionalized polyhedral oligomeric silsesquioxane". Journal of Coatings Technology & Research, 7(4), (2010); pp. 455-467.*

Gonda et al. "Adsorption of Transitional Metal Cations onto a Lamellar Poly(3-aminopropyl)silsesquioxane: Cation-Cation Interaction and Transition of Adsorption Phase" J. Phys.Chem. C 2010 (114), pp. 20076-20082.

International Search Report and Written Opinion PCT/US2016/049388 dated Nov. 8, 2016, 11 pgs.

Isquith et al. "Surface-Bonded Antimicrobial Activity of an Organosilicon Quaternary Ammonium Chloride." Applied Microbiology, 1972. 24(6), pp. 859-863.

Olsson et al. "Core-shell structured ferrite-silsesquioxane-epoxy nanocomposites: Composite homogeneity and mechanical and magnetic properties" Polymer Engineering & Science, May 2011. 51(5) pp. 862-874.

Vilcnik et al. "Structural properties and antibacterial effects of hydrophobic and oleophobic sol-gel coatings for cotton fabrics" Langmuir 2009. 25(10), pp. 5869-5880.

* cited by examiner

ANTIMICROBIAL-ANTIREFLECTIVE ARTICLES AND METHODS FOR MAKING THE SAME

CROSS-REFERENCE TO RELATED APPLICATIONS

This application is a national filing of International Application No. PCT/US2016/049388, filed Aug. 30, 2016, which claims the benefit of priority under 35 U.S.C. § 119 of U.S. Provisional Application Ser. No. 62/213,220 filed on Sep. 2, 2015, the content of which is relied upon and incorporated herein by reference in its entirety

TECHNICAL FIELD

The present disclosure relates generally to antimicrobial and antireflective coating structures and elements. More particularly, the various embodiments described herein relate to glass, ceramic and glass-ceramic articles having antimicrobial-antireflective coatings disposed thereon such that the coated articles exhibit improved antimicrobial efficacy and antireflective optical properties, as well as methods of making and using the coated articles.

BACKGROUND

Touch-activated or -interactive devices, such as screen surfaces (e.g., surfaces of electronic devices having user-interactive capabilities that are activated by touching specific portions of the surfaces), have become increasingly more prevalent. In general, these surfaces should exhibit high optical transmission, low haze, and high durability, among other features. As the extent to which the touch screen-based interactions between a user and a device increases, so too does the likelihood of the surface harboring microorganisms (e.g., bacteria, fungi, viruses, and the like) that can be transferred from user to user.

To minimize the presence of microbes on glass, so-called "antimicrobial" properties have been imparted to a variety of glass articles. Such antimicrobial glass articles, regardless of whether they are used as screen surfaces of touch-activated devices or in other applications, can exhibit poor antimicrobial efficacy under ordinary use conditions despite performing adequately under generally-accepted or standardized testing conditions, can exhibit poor optical or aesthetic properties when exposed to certain conditions during fabrication and/or ordinary use, and/or can be costly to manufacture (e.g., when expensive metals or alloys are used as the antimicrobial agent or when additional steps are required to introduce the antimicrobial agent into or onto the glass). These deficiencies ultimately can make it impractical to implement the antimicrobial glass articles.

Many processes (e.g., ion exchange) for imparting antimicrobial properties to glass articles, such as when certain metals and alloys are employed as the antimicrobial agent, are not suitable for glass-ceramic and ceramic articles under certain conditions. To the extent that such processes can be employed for articles having certain glass-ceramic and ceramic compositions, the processes often must be significantly altered depending on the actual composition of the target article. For example, diffusivity of antimicrobial agents in the articles often dictates the process conditions employed for antimicrobial agents imparted into a glass, glass-ceramic or ceramic article. The diffusivity of antimicrobial agents (e.g., metals and metal alloys) can vary as a function of the article composition. As such, many such processes must be specifically tailored to particular article compositions, leading to high manufacturing and development costs.

Other technologies and processes employed to impart antimicrobial properties on a glass, glass-ceramic or ceramic substrate, such as antimicrobial coating deposition, can reduce the optical performance of the underlying substrate. In particular, the desired optical properties afforded by an antireflective coating can be degraded by the presence of an antimicrobial coating. In view of this trade-off, articles employing these substrates are often developed with an emphasis on antimicrobial properties or antireflective properties, but a useful combination of such properties often cannot be achieved.

There accordingly remains a need for technologies that provide glass, glass-ceramic and ceramic articles with improved antimicrobial efficacy under both ordinary use and generally-accepted testing conditions, with no adverse effects on the optical properties of the articles. More particularly, there is a need for an antimicrobial coating structure that will not significantly deteriorate the optical properties associated with an underlying antireflective structure disposed on a glass, glass-ceramic or ceramic substrate. It would also be advantageous if such technologies could be produced in a relatively low-cost manner. It is to the provision of such technologies that the present disclosure is directed.

BRIEF SUMMARY

Described herein are various antimicrobial articles that have improved antimicrobial efficacy and antireflective properties, along with methods for their manufacture and use.

One type of antimicrobial article includes an antimicrobial ("AM") element and an antireflective ("AR") element. The article exhibits a reflectance of about 4% or less (1% or less in some cases) in the range of about 425 nm to about 725 nm. In addition, the article exhibits at least a log 2 reduction in a concentration of at least *Staphylococcus aureus*, *Enterobacter aerogenes*, and *Pseudomonas aeruginosa* bacteria under modified United States Environmental Protection Agency "Test Method for Efficacy of Copper Alloy Surfaces as a Sanitizer" testing conditions, wherein the modified conditions include substitution of the article having the AM and AR element with the copper-containing surface prescribed in the Method and use of the article having just the AR element as the prescribed control sample in the Method (collectively, the "Modified EPA Copper Test Protocol").

According to another aspect, an antimicrobial article is provided that includes an AM element with an AM element thickness that ranges from about 50 to about 200 nm, an AM element optical thickness, and an AM element refractive index. Further, the antimicrobial article includes an AR element with an AR element thickness, an AR element optical thickness and an AM element refractive index. The article exhibits a reflectance of about 4% or less (1% or less in some cases) in the range of about 425 nm to about 725 nm. In addition, the sum of the AR element optical thickness and the AM element optical thickness is a constant, the AR element optical thickness is given by the AR element thickness times the AR element refractive index, and the AM element optical thickness is given by the AM element thickness times the AM element refractive index. That is, the AR element optical thickness is preferably reduced as the AM element increases in optical thickness.

In certain of these aspects, the antimicrobial article includes a base substrate, wherein the antireflective element is disposed on the base substrate and the antimicrobial element is disposed on the antireflective element. The substrate can comprise a glass, ceramic or glass-ceramic composition. For example, the substrate can be formed from a silicate glass, borosilicate glass, aluminosilicate glass, boroaluminosilicate glass, or similar glass, which optionally includes an alkali or alkaline earth modifier. In other cases, the substrate can be formed from a glass-ceramic comprising a glassy phase and a ceramic phase, where the ceramic phase includes β-spodumene, β-quartz, nepheline, kalsilite, carnegieite, or a similar ceramic material. In addition, the substrate may be formed from a ceramic material including but not limited to inorganic crystalline oxides, nitrides, carbides, oxynitrides, and/or carbonitrides. Further, the substrate can have an average thickness of less than or equal to about 2 millimeters.

In certain of these aspects utilizing a glass or glass-ceramic substrate, the antimicrobial element includes a silicate layer and an AM agent-containing region extending from a surface of the silicate layer to a depth. Depending on the substrate composition, the silicate layer containing the AM agent-containing region can comprise various silicate, alkali silicate or borosilicate compositions containing an AM agent. In many of these implementations, the AM agent, such as copper, silver or zinc, is ion-exchanged into the silicate layer thus forming the AM agent-containing region.

In other of these aspects, the antimicrobial element includes at least partially cured siloxane having organic side chains, wherein at least a portion of the organic side chains include protonated amine substituents or amine substituents having at least one hydrogen. With respect to the antimicrobial element, in some cases, it can be formed from a uncured or partially-cured siloxane coating precursor material comprising organic side chains wherein at least a portion of the organic side chains comprise protonated amine substituents or amine substituents comprising at least one hydrogen. For example, such materials include partially-cured primary amine-substituted linear alkyl silsesquioxanes, one example of which is a partially-cured aminopropyl silsesquioxane ("APSSQ"). When the antimicrobial element primarily comprises organic constituents in coating form, such as an APSSQ coating, the coating extends outward from the underlying AR element and is exposed to the air. In many aspects of the disclosure, the antimicrobial element can possess a thickness that ranges from about 10 nm to about 500 nm.

With regard to the antireflective element, in some aspects it may include a plurality of alternating $SiO_2$ and $Nb_2O_5$ layers. In some embodiments, the antireflective element can include structures, layers and/or compositional variations that provide scratch resistance and/or damage resistance. In another aspect, the antireflective element comprises one or more layers comprising $Al_2O_3$, $AlO_xN_y$, $SiO_xN_y$, $SiAlO_xN_y$, $TiO_2$, $Ta_2O_5$, $MgF_2$, $LaF_3$, $AlF_3$, $HfO_2$, $Y_2O_3$, ZnO and $ZrO_2$. Some aspects of the antireflective element comprise one or more sets of alternating layers comprising low and high refractive index material (or vice versa). In an embodiment, the antireflective element includes a first layer comprising $Nb_2O_5$ disposed on the substrate, a second layer comprising $SiO_2$ disposed on the first layer, and a third layer comprising $Nb_2O_5$ disposed on the second layer. In some implementations, the first layer has a thickness that ranges from 10 to 20 nm, the second layer has a thickness that ranges from 30 to 40 nm, and the third layer has a thickness that ranges from 105 nm to 130 nm, and further wherein the antimicrobial element has a thickness that ranges from 80 nm to 95 nm In many aspects, the antireflective element mitigates 90% or more of ambient reflections from the substrate-air interface, resulting in less than 1% reflection in the visible wavelength range (i.e., 425 nm to 725 nm). In other aspects, the antireflective element exhibits 4% or less reflection in the visible wavelength range.

In some cases, the antimicrobial article can exhibit at least a 5 log reduction in a concentration of at least *Staphylococcus aureus, Enterobacter aerogenes*, and *Pseudomonas aeruginosa* bacteria under Japan Industrial Standard JIS Z 2801 (2000), "Antimicrobial products-Test for antimicrobial activity and efficacy" testing conditions ("JIS Z 2801"). Similarly, in some cases, the antimicrobial article can exhibit at least a 2 log reduction in a concentration of at least *Staphylococcus aureus, Enterobacter aerogenes*, and *Pseudomonas aeruginosa* bacteria under the Modified EPA Copper Test Protocol. In certain implementations, a 3 log, 4 log, or even a 5 log, reduction is viable for the antimicrobial article under the Modified EPA Copper Test Protocol.

In certain implementations, the substrate having a glass or glass-ceramic composition is a chemically-strengthened glass or glass-ceramic substrate having a layer under compression that extends from the surface of the glass or glass-ceramic substrate inward to a selected depth. For example, a compressive stress of the layer under compression can be about 400 MPa to about 1200 MPa, and the depth of the layer under compression can be about 30 micrometers to about 80 micrometers.

Applications for, or uses of, this type of antimicrobial article include forming a portion of a touch-sensitive display screen or cover plate for an electronic device, a non-touch-sensitive component of an electronic device, a surface of a household appliance, a surface of medical equipment, a biological or medical packaging vessel, an architectural component, a surface of a vehicle component, or the like.

One type of method for making the antimicrobial article can include forming an antimicrobial element (e.g., a coating) from an antimicrobial coating precursor material on at least a portion of the antireflective element disposed over a surface of a glass, glass-ceramic or ceramic substrate, or directly on the substrate with no intervening element present. The antimicrobial element can be an at least partially cured siloxane having organic side chains, wherein at least a portion of the organic side chains include protonated amine substituents or amine substituents having at least one hydrogen atom. The antimicrobial coating precursor material can be an uncured or partially-cured siloxane coating precursor material having organic side chains wherein at least a portion of the organic side chains include protonated amine substituents or amine substituents having at least one hydrogen. In certain cases, the method can further include a step of forming the antireflective element on at least a portion of the surface of the substrate prior to forming the antimicrobial element upon the antireflective element. In other cases, the method can further include a step of forming an antireflective element on a region on the surface of the substrate on which the antimicrobial element is not disposed.

In certain aspects of the disclosure, the method of making an antimicrobial article can include steps for providing a glass or glass-ceramic substrate, along with steps for providing an antimicrobial element that includes a silicate layer and an AM agent-containing region extending from a surface of the silicate layer to a depth. The silicate layer can be developed by a solution coating, sputtering, an evaporation process or other technique as understood by those with ordinary skill in the field of the disclosure. Depending on the substrate composition, the silicate layer and the AM agent-containing region can comprise various silicate, alkali silicate or borosilicate compositions containing an AM agent. In many of these implementations, the AM agent, such as copper, silver or zinc, is incorporated into the silicate layer by one or more ion-exchange steps thus forming the AM agent-containing region in the silicate layer. Further, the method can include a step of forming an antireflective element on at least a portion of the surface of the substrate prior to forming the antimicrobial element. In other cases, the method can further include a step of forming an antireflective element on a region of the surface of the substrate on which the antimicrobial element is not disposed, or in proximity to an AM agent-containing region within the substrate.

It is to be understood that both the foregoing brief summary and the following detailed description describe various embodiments and are intended to provide an overview or framework for understanding the nature and character of the claimed subject matter.

Figure 1:
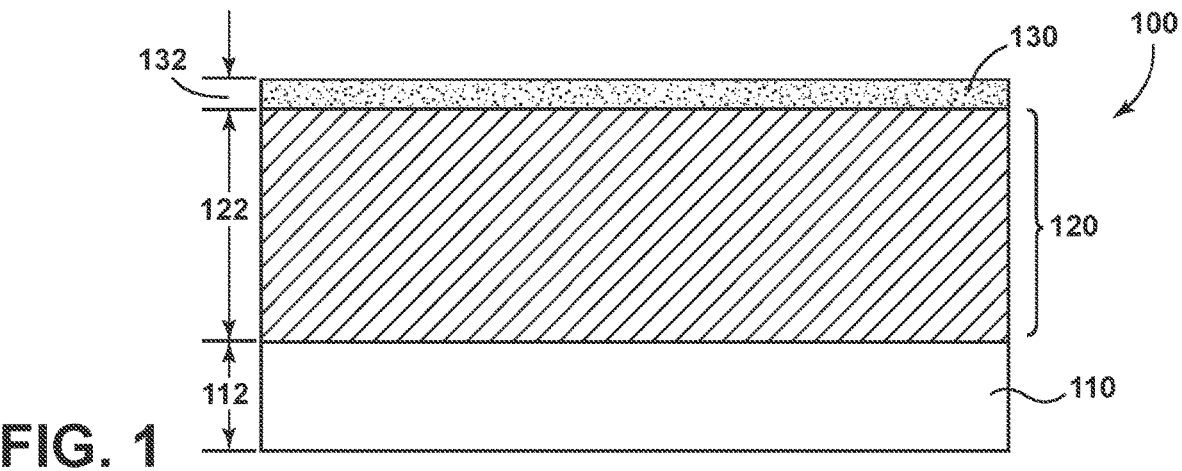
FIG. 1 is a schematic cross-section of an antimicrobial article that includes an antireflective element and an antimicrobial element disposed over a substrate.

These and other aspects, advantages, and salient features will become apparent from the following detailed description, the accompanying drawings, and the appended claims.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Described herein are various antimicrobial articles that have improved antimicrobial efficacy both under ordinary use conditions and under generally-accepted testing conditions, along with methods for their manufacture and use. The term "antimicrobial" refers herein to the ability to kill or inhibit the growth of more than one species of more than one type of microbe (e.g., bacteria, viruses, fungi, and the like). In general, the improved articles and methods described herein involve the use of an antimicrobial element disposed on an antireflective element. In some implementations, the antireflective element is disposed on at least a portion of a surface of a substrate having a glass, glass-ceramic or ceramic composition.

The antimicrobial elements beneficially provide the articles with improved antimicrobial efficacy both under ordinary use conditions and under generally-accepted testing conditions relative to similar or identical articles that lack the antimicrobial element. In addition, and as will be described in more detail below, the antimicrobial articles can exhibit excellent optical properties including high transmissivity, low haze and low reflectance.

As stated above, the substrate on which the antireflective and antimicrobial elements can be disposed can comprise a glass, glass-ceramic or ceramic material. The choice of material is not limited to a particular composition, as improved antimicrobial efficacy can be obtained using a variety of glass, glass-ceramic and ceramic compositions. For example, with respect to glasses, the material chosen can be any of a wide range of silicate, borosilicate, aluminosilicate, or boroaluminosilicate glass compositions, which optionally can comprise one or more alkali and/or alkaline earth modifiers.

By way of illustration, one family of compositions includes those having at least one of aluminum oxide or boron oxide and at least one of an alkali metal oxide or an alkali earth metal oxide, wherein −15 mol %≤($R_2O+R'O-Al_2O_3-ZrO_2$)−$B_2O_3$≤4 mol %, where R can be Li, Na, K, Rb, and/or Cs, and R' can be Mg, Ca, Sr, and/or Ba. One subset of this family of compositions includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Such glasses are described more fully in U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004,677, filed on Nov. 29, 2008, the contents of which are incorporated herein by reference in their entireties as if fully set forth below.

Another illustrative family of compositions includes those having at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. One subset of this family includes from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. Such glasses are described in more fully in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entireties as if fully set forth below.

Yet another illustrative family of compositions includes those having $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. One subset of this family of compositions includes from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. Another subset of this family of compositions includes from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. Such glasses are described more fully in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entireties as if fully set forth below.

Yet another illustrative family of compositions includes those having at least about 4 mol % $P_2O_5$, wherein ($M_2O_3$ (mol %)/$R_xO$ (mol %))<1, wherein $M_2O_3$=$Al_2O_3$+$B_2O_3$, and wherein $R_xO$ is the sum of monovalent and divalent cation oxides present in the glass. The monovalent and divalent cation oxides can be selected from the group consisting of $Li_2O$, $Na_2O$, $K_2O$, $Rb_2O$, $Cs_2O$, MgO, CaO, SrO, BaO, and ZnO. One subset of this family of compositions includes glasses having 0 mol % $B_2O_3$. Such glasses are more fully described in U.S. Provisional Patent Application No. 61/560,434 by Timothy M. Gross, entitled "Ion Exchangeable Glass with High Crack Initiation Threshold," filed Nov. 16, 2011, the contents of which are incorporated herein by reference in their entirety as if fully set forth below.

Still another illustrative family of compositions includes those having $Al_2O_3$, $B_2O_3$, alkali metal oxides, and contains boron cations having three-fold coordination. When ion exchanged, these glasses can have a Vickers crack initiation threshold of at least about 30 kilograms force (kgf). One subset of this family of compositions includes at least about 50 mol % $SiO_2$; at least about 10 mol % $R_2O$, wherein $R_2O$ comprises $Na_2O$; $Al_2O_3$, wherein −0.5 mol %≤$Al_2O_3$(mol %)−$R_2O$ (mol %)≤2 mol %; and $B_2O_3$, and wherein $B_2O_3$ (mol %)−($R_2O$ (mol %)−$Al_2O_3$(mol %))≥4.5 mol %. Another subset of this family of compositions includes at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0≤MgO+ZnO≤6 mol %; and, optionally, at least one of CaO, BaO, and SrO, wherein 0 mol %≤CaO+SrO+BaO≤2 mol %. Such glasses are more fully described in U.S. Provisional Patent Application No. 61/653,485 by Matthew J. Dejneka et al., entitled "Ion Exchangeable Glass with High Damage Resistance," filed May 31, 2012, the contents of which are incorporated herein by reference in their entirety as if fully set forth below.

Similarly, with respect to glass-ceramics, the material chosen for the substrate can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite.

In addition, the substrate may be formed from a ceramic material including but not limited to inorganic crystalline oxides, nitrides, carbides, oxynitrides, and/or carbonitrides. For example, the substrate can comprise $Al_2O_3$, SiC, SiN and other ceramic compositions. Often, the ceramic composition is selected based on the particular application of the antimicrobial article.

The substrate having a glass, glass-ceramic or ceramic composition can adopt a variety of physical forms. That is, from a cross-sectional perspective, the substrate can be flat or planar, or it can be curved and/or sharply-bent. Similarly, it can be a single unitary object, or a multi-layered structure or laminate. Further, the substrate optionally can be annealed and/or strengthened (e.g., by thermal tempering, chemical ion-exchange, or like processes).

The antimicrobial element that is disposed, either directly or indirectly, over the substrate, the antireflective element, or portions of these features, can be formed from a variety of materials, termed "coating precursor materials" herein for convenience only. The coating precursor material for the antimicrobial element and the final antimicrobial element generally include an amine or protonated amine (ammonium) component to provide the requisite antimicrobial behavior, as well as an inorganic component to provide the ability to strongly bond to the surface of the glass, glass-ceramic or ceramic substrate or the antireflective element (often comprising a glass, ceramic and glass-ceramic composition). The coating precursor material, and, by extension, the final antimicrobial element produced therefrom, will also be selected such that it imparts other desirable properties (e.g., appropriate levels of haze, transmittance, durability, and the like) to the final antimicrobial article.

Exemplary coating precursor materials that can be used to form the antimicrobial element include uncured and partially-cured siloxanes having organic side chains (e.g., silsesquioxanes or silicones), wherein at least a portion of the organic side chains include amine or protonated amine substituents. For the purposes of the present disclosure, these coating precursor materials can be designated by the general formula $[-R_2SiO-]_n$, wherein each R in the n repeat groups is independently a hydrogen, hydroxyl, or hydrocarbon group or moiety, with the provisos that not all of the R groups in the n repeat units are hydrogen or hydroxyl, and that at least a portion of the R groups in the n repeat units are hydrocarbon groups having amine or protonated amine substituents. The hydrocarbon group can be a substituted or unsubstituted (e.g., with the amine or protonated amine group), linear or branched, chain or cyclic structure having between 1 and 22 carbons. It is important that these materials are not fully cured prior to their application to the substrate, because a fully cured material will not be able to chemically bond to the glass or glass-ceramic substrate, nor be able to be applied thinly. One illustrative class of such coating precursor materials includes partially-cured primary amine-substituted linear alkyl silsesquioxanes (e.g., partially-cured aminopropyl siloxane, partially-cured aminobutyl siloxane, partially-cured aminopentyl siloxane, and the like).

When such a coating precursor material is used, the antimicrobial element itself generally will include an at-least-partially-cured siloxane. In most implementations involving an uncured or partially-cured siloxane having organic side chains with amine or protonated amine substituents as the coating precursor material, the final antimicrobial element will be essentially cured. That is, essentially all of the hydroxyl pendant groups or moieties on the silicon atoms in the coating precursor material will participate in a condensation reaction (i.e., such that they, along with the pendant hydrogen or hydrocarbon "R" groups or moieties of the general structure defined above, are removed from a siloxane unit during the combination of two separate siloxane units). Thus, for the purposes of the present disclosure, "essentially cured" means that a concentration of pendant hydroxyl groups in the partially-cured siloxane of the antimicrobial element can be less than or equal to about 5 percent of the concentration of any pendant hydrogen and hydrocarbon groups in the partially-cured siloxane of the antimicrobial coating, when measured for example by nuclear magnetic resonance spectroscopy (NMR).

In some embodiments, the antimicrobial article can employ a glass or glass-ceramic substrate and the antimicrobial element can include a silicate layer and an AM agent-containing region extending from a surface of the silicate layer to a depth. The silicate layer can be developed by a solution coating, sputtering, an evaporation process or other technique as understood by those with ordinary skill in the field of the disclosure. Depending on the substrate composition, the silicate layer and the AM agent-containing region can comprise various silicate, alkali silicate or borosilicate compositions containing an AM agent. As such, the antimicrobial element can extend into the substrate to a certain depth. In many of these implementations, the AM agent, such as copper, silver or zinc, is incorporated into the silicate layer by one or more ion-exchange steps thus forming the AM agent-containing region.

In certain of the foregoing aspects, the thickness of the antimicrobial element can range from 10 to 500 nm, and all values within this range including, but not limited to, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 250 nm, 300 nm, 350 nm, 400 nm, 450 nm and 500 nm. In some preferred implementations, the thickness can range from 50 nm to 250 nm. Further, a preferred implementation of the antimicrobial element is an APSSQ coating having a thickness ranging from 75 to 150 nm.

The antireflective element can include one or more inorganic layers configured to mitigate ambient reflections in the antimicrobial article. In some aspects, the antireflective element mitigates approximately 90% of ambient reflections from a single air-glass interface. Such an antireflective element can result in less than 1% reflection in the visible wavelength range for the antimicrobial article. In other aspects, the antireflective element can result in about 4% or less reflection in the visible spectrum. Other implementations of the antimicrobial article include an antireflective element that results in 3.5% or less, 3% or less, 2.5% or less, 2% or less, 1.5% or less, 1% or less and down to 0.5% or less reflectance in the visible spectrum.

In certain aspects, the antireflective element comprises $TiO_2$, $Nb_2O_5$ and other oxide compositions and structures configured to produce antireflective properties. In one aspect, the antireflective element comprises one or more sets of alternating layers of $TiO_2$ and $Nb_2O_5$. In another aspect, the antireflective element comprises one or more layers comprising $Al_2O_3$, $AlO_xN_y$, $SiO_xN_y$, $SiAlO_xN_y$, $TiO_2$, $Ta_2O_5$, $MgF_2$, $LaF_2$, $AlF_3$, $HfO_2$, $Y_2O_3$, $ZnO$ and $ZrO_2$. Some aspects of the antireflective element comprise one or more sets of alternating layers comprising low and high refractive index material (or vice versa). In a further aspect, the antireflective element can include structures, layers and/or compositional variations that provide scratch resistance and/or damage resistance.

In certain aspects, the antireflective element can have a thickness from 50 to 1000 nm. In some implementations, the thickness of the antireflective element can be 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm and 1000 nm. For aspects of the antimicrobial articles having antireflective elements comprising a plurality of layers, the layers can range from 50 to 500 nm, depending on the number of layers employed in the antireflective element.

Referring to FIG. 1, an antimicrobial article 100 is provided that includes an antimicrobial element 130 disposed over an antireflective element 120. The antireflective element 120 is disposed over a substrate 110. The antimicrobial element 130, antireflective element 120 and substrate 110 have thicknesses 132, 122 and 112, respectively. In certain aspects, the substrate 110 comprises a glass, ceramic or glass-ceramic composition.

In certain preferred embodiments of the antimicrobial article 100, the antimicrobial element 130 is left bare or otherwise exposed to the environment. In those aspects in which the antimicrobial element 130 remains in a bare configuration, exposure between the antimicrobial element and microbes is maximized. In other embodiments, the antimicrobial article 100 can possess an additional layer, layers or other structures over portions or the entirety of the antimicrobial element 130. Generally, such additional layers will be relatively thin and provide little to no barrier between microbes and the underlying antimicrobial element 130. To the extent that these additional layers provide a barrier, they are preferably characterized by a high microbe and/or antimicrobial agent diffusivity or otherwise contain sufficient interconnected porosity to facilitate exposure between the microbes and the antimicrobial agent within the underlying antimicrobial element 130.

Still referring to FIG. 1, the antimicrobial article 100 can exhibit a reflectance of about 4% or less in the range of 425 nm to about 725 nm. Other aspects of the antimicrobial article 100 exhibit a reflectance of 3.5% or less, 3% or less, 2.5% or less, 2% or less, 1.5% or less, 1% or less, 0.5% or less reflectance in the range of 425 nm to about 725 nm. In certain implementations, the article 100 can exhibit at least a 2 log reduction in a concentration of at least *Staphylococcus aureus, Enterobacter aerogenes*, and *Pseudomonas aeruginosa* bacteria under modified United States Environmental Protection Agency "Test Method for Efficacy of Copper Alloy Surfaces as a Sanitizer" testing conditions, hereby incorporated by reference. In particular, the modified conditions include substitution of the article having the AM and AR element with the copper-containing surface prescribed in the Method and use of the article having just the AR element as the prescribed control sample in the Method (collectively, the "Modified EPA Copper Test Protocol").

Another type of antimicrobial article 100 according to the disclosure includes an antimicrobial element 130 and an antireflective element 120 (see FIG. 1). In this aspect, the article 100 serves as a coating, set of layers, thin film structure or the like as disposed over a surface of a device, article, object of the like (not shown) for the purpose of providing antimicrobial and antireflective capabilities. Such an antimicrobial article 100 in this form can exhibit a reflectance of about 4% or less in the range of about 425 nm to about 725 nm. According to some embodiments, this type of antimicrobial article 100 can exhibit a reflectance of 3.5% or less, 3% or less, 2.5% or less, 2% or less, 1.5% or less, 1% or less, or as low as 0.5% or less reflectance in the range of 425 nm to about 725 nm. In addition, the article 100 can exhibit at least a log 2 reduction in a concentration of at least *Staphylococcus aureus, Enterobacter aerogenes*, and *Pseudomonas aeruginosa* bacteria under the Modified EPA Copper Test Protocol.

In some aspects, the antimicrobial element 130 includes at least partially cured siloxane having organic side chains, wherein at least a portion of the organic side chains include protonated amine substituents or amine substituents having at least one hydrogen. The antimicrobial element 130, in certain aspects, can possess a thickness 132 that ranges from about 10 nm to about 500 nm.

With respect to the antimicrobial element 130 (see FIG. 1) of the antimicrobial article 100, in some cases, it can be formed from a uncured or partially-cured siloxane coating precursor material comprising organic side chains wherein at least a portion of the organic side chains comprise protonated amine substituents or amine substituents comprising at least one hydrogen. For example, such materials include partially-cured primary amine-substituted linear alkyl silsesquioxanes, one example of which is a partially-cured aminopropyl silsesquioxane ("APSSQ").

In other implementations, the antimicrobial element 130 can exist as a silicate layer comprising an AM agent-containing region extending from a surface of the silicate layer to a depth. The silicate layer can be developed by a solution coating, sputtering, an evaporation process or other technique as understood by those with ordinary skill in the field of the disclosure. Depending on the substrate composition, the silicate layer and the AM agent-containing region can comprise various silicate, alkali silicate or borosilicate compositions containing an AM agent to form an antimicrobial element 130 within the substrate 110 (not shown). As such, the antimicrobial element 130 can extend into the substrate 110 to a certain depth. In many of these implementations, the AM agent, such as copper, silver or zinc, is incorporated into the silicate layer by one or more ion-exchange steps thus forming the AM agent-containing region.

According to another aspect, an antimicrobial article 100 (see FIG. 1) is provided that includes an AM element 130 with an AM element thickness 132 that ranges from about 50 to about 200 nm, and an AR element 120 with an AR element thickness 122. The article 100 exhibits a reflectance of about 4% or less in the range of about 425 nm to about 725 nm. In some implementations, this type of antimicrobial article 100 can exhibit a reflectance of 3.5% or less, 3% or less, 2.5% or less, 2% or less, 1.5% or less, 1% or less, or as low as 0.5% or less reflectance in the range of 425 nm to about 725 nm. In addition, the AR element optical thickness (i.e., the AR element thickness 122 times the refractive index of the AR element 120) can be varied such that the sum of the AR element optical thickness and the AM element optical thickness (i.e., the AM element thickness 132 times the refractive index of the AM element 130) is a constant. That is, the AR element optical thickness is preferably reduced as the AM element 130 increases in optical thickness—i.e., the AM element thickness 132 increases when the AR element thickness 122 is reduced.

Figure 1A:
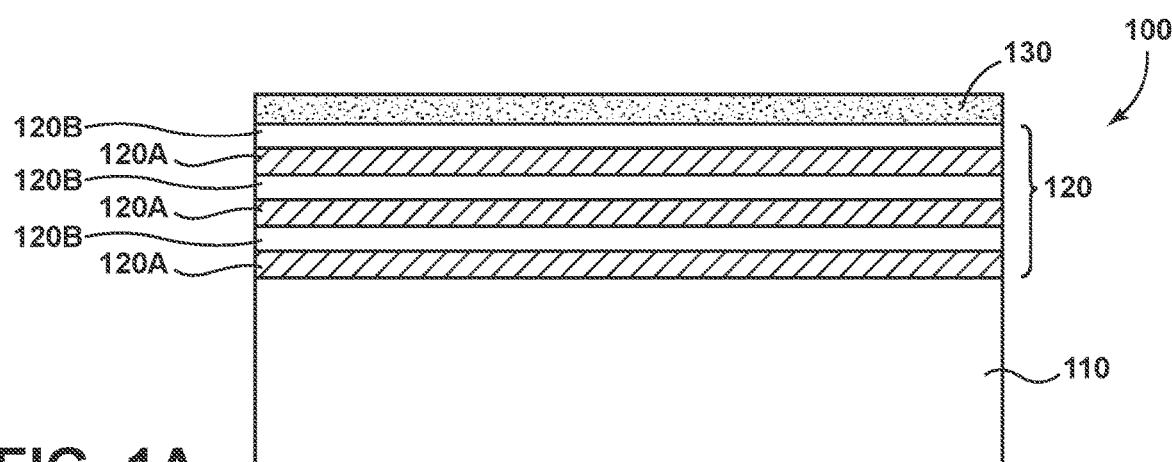
FIG. 1A is schematic cross-section of the antimicrobial article depicted in FIG. 1 with an antireflective element that includes a plurality of alternating layers.

In certain implementations, the antimicrobial article 100 can be configured with an AM element 130 and an AR element 120 as depicted in FIG. 1A. The antireflective element 120 includes a plurality of alternating layers 120A and 120B. In certain aspects, the layers 120A and 120B comprise $SiO_2$, $Nb_2O_5$, and/or other oxides which contribute or otherwise function as an antireflective coating or structure. In another aspect, the antireflective element 120 comprises one or more layers 120A and 120B comprising $Al_2O_3$, $AlO_xN_y$, $SiO_xN_y$, $SiAlO_xN_y$, $TiO_2$, $Ta_2O_5$, $MgF_2$, $LaF_2$, $AlF_3$, $HfO_2$, $Y_2O_3$, $ZnO$ and $ZrO_2$. Some aspects of the antireflective element 120 comprise one or more sets of alternating layers 120A and 120B comprising low and high refractive index material (or vice versa). The number of sets of alternating layers can range from 1 to as high as 1000, depending on the thickness of each of the layers 120A and 120B. In certain embodiments, the sum of the AR element optical thickness (i.e., the AR element thickness 122 times the refractive index of the AR element 120) and the AM element optical thickness (i.e., the AM element thickness 132 times the refractive index of the AM element 130) is a constant Consequently, the thickness of each of the layers 120A and 120B can be reduced or increased as the thickness 130 of the AM element is increased or reduced. This approach can yield an antimicrobial article 100 with excellent antimicrobial properties by virtue of the AM element 130 while still demonstrating antireflective properties by virtue of the AR element 120.

Figure 1B:
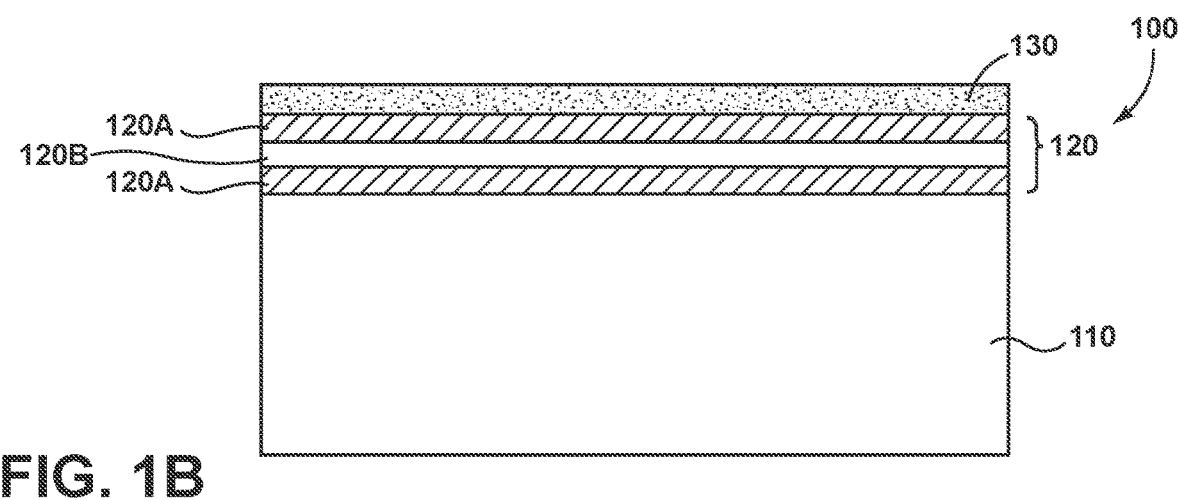
FIG. 1B is schematic cross-section of the antimicrobial article depicted in FIG. 1 with an antireflective element that includes a first layer comprising $Nb_2O_5$, a second layer comprising $SiO_2$, and a third layer comprising $Nb_2O_5$.

With regard to the antireflective element 120, in certain exemplary aspects it may include a plurality of alternating $SiO_2$ and $Nb_2O_5$ layers. In some implementations, the antireflective element 120 can include structures, layers and/or compositional variations that provide scratch resistance and/ or damage resistance. As depicted in FIG. 1B, the antireflective element 120 includes a first layer 120A comprising $Nb_2O_5$ disposed on the substrate 110, a second layer 120B comprising $SiO_2$ disposed on the first layer 120A, and a third layer 120A comprising $Nb_2O_5$ disposed on the second layer. In some implementations, the first layer 120A has a thickness that ranges from 10 to 20 nm, the second layer 120B has a thickness that ranges from 30 to 40 nm, and the third layer 120A has a thickness that ranges from 105 nm to 130 nm, and further wherein the antimicrobial element 120 has a thickness 122 that ranges from 80 nm to 95 nm In many embodiments, the antireflective element 120 mitigates 90% or more of ambient reflections from the substrate-air interface, resulting in less than 1% reflection in the visible wavelength range (i.e., 425 nm to 725 nm).

In some cases, the antimicrobial article 100 can exhibit at least a 5 log reduction in a concentration of at least *Staphylococcus aureus*, *Enterobacter aerogenes*, and *Pseudomonas aeruginosa* bacteria under Japan Industrial Standard JIS Z 2801 (2000), "Antimicrobial products-Test for antimicrobial activity and efficacy" testing conditions ("JIS Z 2801"), hereby incorporated by reference within this disclosure. Similarly, in some cases, the antimicrobial article 100 can exhibit at least a 2 log reduction in a concentration of at least *Staphylococcus aureus*, *Enterobacter aerogenes*, and *Pseudomonas aeruginosa* bacteria under the Modified EPA Copper Test Protocol. In certain implementations, a 3 log, 4 log, or even a 5 log, reduction is viable for the antimicrobial article 100 under the Modified EPA Copper Test Protocol.

In certain implementations, the substrate 110 having a glass or glass-ceramic composition is a chemically-strengthened glass or glass-ceramic substrate having a layer under compression that extends from the surface of the glass or glass-ceramic substrate inward to a selected depth. For example, a compressive stress of the layer under compression can be about 400 MPa to about 1200 MPa, and the depth of the layer under compression can be about 30 micrometers to about 80 micrometers.

Applications for, or uses of, these types of antimicrobial articles 100 include forming a portion of a touch-sensitive display screen or cover plate for an electronic device, a non-touch-sensitive component of an electronic device, a surface of a household appliance, a surface of medical equipment, a biological or medical packaging vessel, an architectural component, a surface of a vehicle component, or the like.

Methods of making the above-described antimicrobial articles 100 generally include the steps of providing a substrate (e.g., substrate 110) having a glass, glass-ceramic or ceramic composition, forming an antireflective element (e.g., antireflective element 120) on or over the substrate, and forming the antimicrobial element (e.g., antireflective element 130) on or over at least a portion of a surface of the antireflective element. It should be noted that the surface fraction of the substrate that is covered by the antimicrobial element does not have to be the same as the surface fraction covered by the antireflective element.

One type of method for making the antimicrobial article 100 can include forming an antimicrobial element (e.g., a coating serving as an AM element 130) from an antimicrobial coating precursor material on at least a portion of the antireflective element disposed over a surface of a glass, glass-ceramic or ceramic substrate, or directly on the substrate with no intervening element present. The antimicrobial element can be an at least partially cured siloxane having organic side chains, wherein at least a portion of the organic side chains include protonated amine substituents or amine substituents having at least one hydrogen atom. The antimicrobial coating precursor material can be an uncured or partially-cured siloxane coating precursor material having organic side chains wherein at least a portion of the organic side chains include protonated amine substituents or amine substituents having at least one hydrogen. In certain cases, the method can further include a step of forming the antireflective element on at least a portion of the surface of the substrate prior to forming the antimicrobial element upon the antireflective element. In other cases, the method can further include a step of forming an antireflective element on a region on the surface of the substrate on which the antimicrobial element is not disposed.

The selection of materials used in the substrates (e.g., substrates 110), antimicrobial elements (e.g., AM elements 130), and antireflective elements (e.g., AR elements 120) can be made based on the particular application desired for the final antimicrobial article. In general, however, the specific materials will be chosen from those described above for the antimicrobial articles.

Provision of the substrate can involve selection of a glass, glass-ceramic, or ceramic object as-manufactured, or it can entail subjecting the as-manufactured glass, glass-ceramic or ceramic object to a treatment in preparation for forming the antireflective element and the antimicrobial element. Examples of such pre-coating treatments include physical or chemical cleaning, physical or chemical strengthening, physical or chemical etching, physical or chemical polishing, annealing, shaping, and/or the like. Such processes are known to those skilled in the art to which this disclosure pertains.

Once the substrate composition has been selected and/or prepared, the antireflective element and the antimicrobial element (or portions thereof) can be disposed on or over the substrate. Depending on the materials chosen, these structures can be formed using a variety of techniques. In some aspects of the disclosure, it is important to note that the coatings and structures described herein (i.e., both the antireflective element and the antimicrobial element) are not free-standing films that can be applied (e.g., via an adhesive or other fastening means) to the surface of the substrate, but are, in fact, physically formed on the surface of the substrate.

In general, the antireflective element (e.g., AR element 120, and layers 120A and 120B) can be fabricated independently using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains.

In many implementations, the materials used to form the AR element and/or the AM element may need to undergo an additional treatment step to finalize these layers. By way of example, in cases when the antimicrobial coating precursor material is applied to the substrate in liquid form, it can undergo a thermal or radiation curing step to form the final AM element. In those situations when the antimicrobial coating precursor material is formed from a siloxane material, the curing step is generally a condensation reaction, which results in a structural rearrangement of the individual siloxane units to form a cage- or ladder-like structure.

Once the antimicrobial article (e.g., article 100) is formed, it can be used in a variety of applications where the article will come into contact with undesirable microbes. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), medical equipment, biological or medical packaging vessels, architectural components, and vehicle components, just to name a few devices.

Given the breadth of potential uses for the improved antimicrobial articles described herein, it should be understood that the specific features or properties of a particular article will depend on the ultimate application therefor or use thereof. The following description, however, will provide some general considerations.

There is no particular limitation on the average thickness (e.g., substrate thickness 112) of the substrate (e.g., substrate 110) contemplated herein. In many exemplary applications, however the average thickness will be less than or equal to about 15 millimeters (mm). If the antimicrobial article is to be used in applications where it may be desirable to optimize thickness for weight, cost, and strength characteristics (e.g., in electronic devices, or the like), then even thinner substrates (e.g., less than or equal to about 5 mm) can be used. By way of example, if the antimicrobial article is intended to function as a cover for a touch screen display, then the substrate can exhibit an average thickness of about 0.02 mm to about 2.0 mm.

In contrast to the substrate, where thickness is generally not limited, the average thickness (e.g., thickness 132) of the AM element should be less than or equal to about 10 micrometers (μm). If the AM element is much thicker than this, it could have adverse effects on the haze, optical transmittance, scratch resistance, and/or durability of the final coated article. To illustrate, with thinner AM elements, a potential scratch to the surface can be resisted better by the more durable underlying substrate and/or AR element, because the scratch is actually absorbed by the underlying substrate and/or AR element rather than the AM element. If the AM element is thicker than 100 nanometers (nm) on average, then the scratch will be absorbed by the coating itself and will be visible to the naked eye. Thus, in applications where high scratch resistance is important or critical (in addition to the improved antimicrobial efficacy provided by the AM element), the average thickness 132 of the AM element should be less than or equal to 75 nm.

On the other hand, optical properties of the antimicrobial articles, particularly antireflective properties from the AR element, can be enhanced by utilizing an AM element with relatively lower thickness levels, e.g., from about 10 to 500 nm. In certain preferred implementations, the AM element thickness is between about 50 and 250 nm. In certain embodiments, the AM element thickness is controlled to range from about 75 nm to about 150 nm.

In general, the optical transmittance of the antimicrobial article (e.g., antimicrobial article 100) will depend on the type of materials chosen. For example, if a glass, glass-ceramic or ceramic substrate is used without any pigments added thereto and/or the antimicrobial element is sufficiently thin, the antimicrobial article can have a transparency over the entire visible spectrum of at least about 85%. In certain cases where the antimicrobial article is used in the construction of a touch screen for an electronic device, for example, the transparency of the article can be at least about 92% over the visible spectrum. In situations where the substrate comprises a pigment (or is not colorless by virtue of its material constituents) and/or the antimicrobial element is sufficiently thick, the transparency can diminish, even to the point of being opaque across the visible spectrum. Thus, there is no particular limitation on the optical transmittance of the antimicrobial article itself.

Like transmittance, the haze of the antimicrobial article can be tailored to the particular application. As used herein, the terms "haze" and "transmission haze" refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the antimicrobial article is used in the construction of a touch screen for an electronic device, the haze of the coated article can be less than or equal to about 5%.

In implementations of the antimicrobial article in which its substrate employs a glass or glass-ceramic composition that is strengthened, the substrate will have a layer under compression that extends from a surface of the substrate itself inward to a selected depth. While each surface of the substrate of the antimicrobial article can have a layer under compression, for the purposes of the present disclosure, when a substrate is described as having such a layer, the surface of reference is at least that on which the antireflective element (e.g., antireflective element 120) is disposed. The compressive stress ("CS") of the layer under compression, and the depth of this layer ("DOL") can be measured using a glass or glass-ceramic surface stress meter, which is an optical tool that generally uses the photoelastic constant and index of refraction of the substrate material itself, and converts the measured optical interference fringe patterns to specific CS and DOL values. In those situations in which the antimicrobial article is used in the construction of a touch screen for an electronic device, the CS and DOL of the article generally can be, respectively, about 400 megapascals (MPa) to about 1200 MPa and about 30 μm to about 80 μm. Importantly, in many implementations, each of the CS and DOL does not change by more than about 5 percent after the AR and AM elements are disposed thereon.

Regardless of the application or use, the antimicrobial articles described herein offer improved antimicrobial efficacy relative to identical articles that lack the antimicrobial elements described herein.

The antimicrobial activity and efficacy of the antimicrobial articles described herein can be quite high. As outlined earlier in the disclosure, the antimicrobial activity and efficacy can be measured in accordance with JIS Z 2801 (2000). Under the "wet" conditions of this test (i.e., about 37° C. and greater than 90% humidity for about 24 hours), the antimicrobial articles described herein can exhibit at least a 5 log reduction in the concentration (or a kill rate of 99.999%) of at least *Staphylococcus aureus, Enterobacter aerogenes*, and *Pseudomonas aeruginosa* bacteria. In certain implementations, the antimicrobial articles described herein can exhibit at least a 7 log reduction in the concentration of any bacteria to which it is exposed under the testing conditions of JIS Z 2801.

In scenarios where the "wet" testing conditions of JIS Z 2801 do not reflect actual use conditions of the antimicrobial articles described herein (e.g., when the articles are used in electronic devices, or the like), the antimicrobial activity and efficacy can be measured using "drier" conditions. For example, the antimicrobial articles can be tested using a modified version of the protocol adopted by the United States Environmental Protection Agency for use on copper-containing surfaces, i.e., the Modified EPA Copper Test Protocol. The modification can entail substitution of an antimicrobial article of the disclosure (e.g., an article having AM and AR elements) with the copper-containing surfaces of the Protocol, along with designating an article having a glass, glass-ceramic or ceramic substrate and a bare AR element as the standard or control sample of the Protocol. Using this modified Protocol, the antimicrobial articles described herein can exhibit at least a 2 log reduction in the concentration (or a kill rate of 99%) of at least *Staphylococcus aureus, Enterobacter aerogenes*, and *Pseudomonas aeruginosa* bacteria. In certain implementations, the antimicrobial articles described herein can exhibit at least a 3 log, 4 log or even a 5 log reduction in the concentration of any bacteria to which it is exposed under the testing conditions of the Modified EPA Copper Test Protocol.

Figure 2:
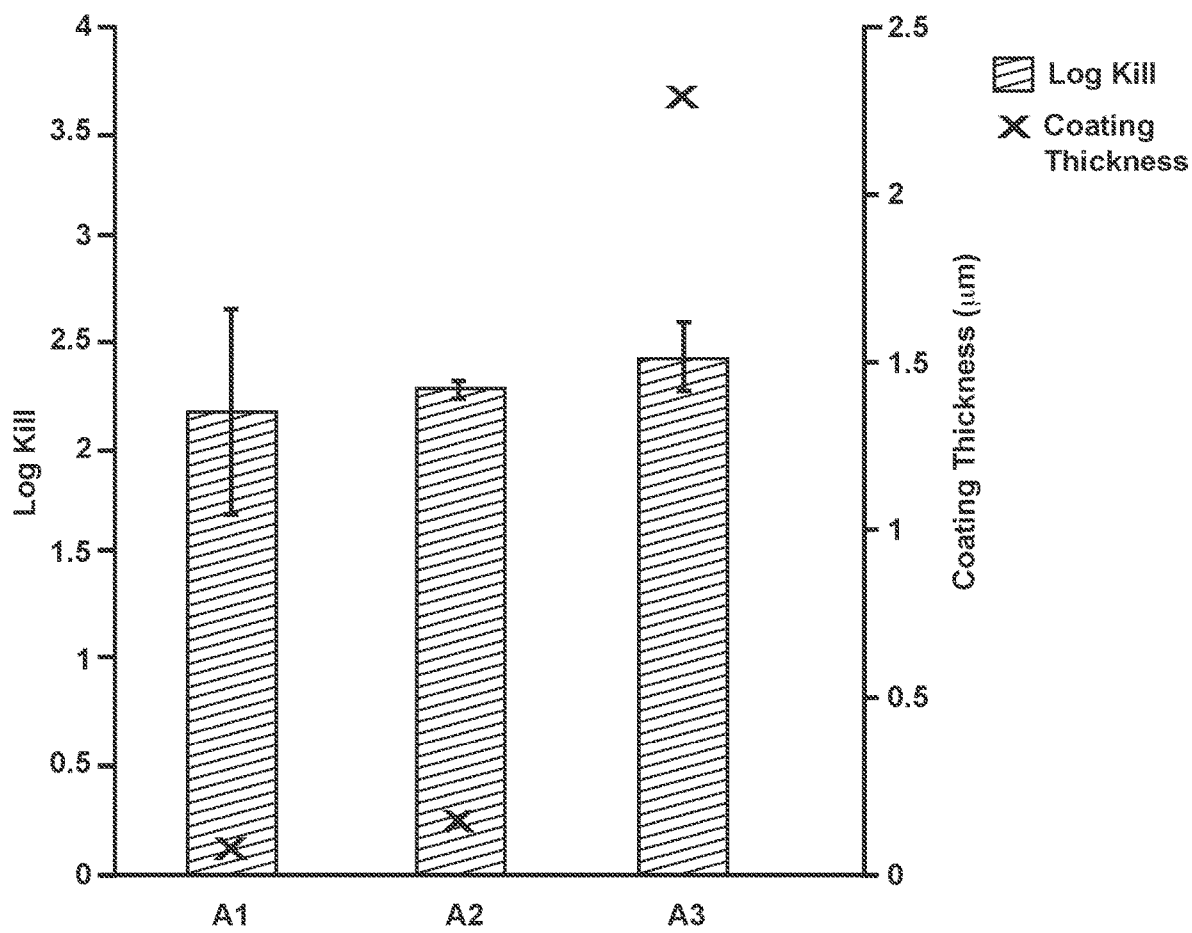
FIG. 2 is a bar chart depicting antimicrobial efficacy data for three antimicrobial articles having antimicrobial elements comprising APSSQ coatings of varying thickness, tested according to the Modified EPA Copper Test Protocol.

Referring to FIG. 2, a bar chart depicts antimicrobial efficacy data for three antimicrobial articles (see, e.g., antimicrobial articles 100 depicted in FIG. 1) having antimicrobial elements (e.g., antimicrobial elements 130) comprising APSSQ coatings of varying thickness, tested according to the Modified EPA Copper Test Protocol. In particular, Corning® Gorilla Glass® substrates were employed for each of the samples designated "A1", "A2" and "A3" in FIG. 2. APSSQ coatings were then applied to one primary surface of substrate according to the following process sequence. First, the substrates dip-coated at a speed of 200 m/m using a water or ethanol-based APSSQ solution at 1, 5 and 25 wt % (i.e., samples designated "A1," "A2" and "A3," respectively). Second, the substrates were then cured at 120° C. for 30 minutes. Next, the substrates were rinsed in water or ethanol to remove excess coating residue and sonicated, as necessary, to ensure removal of all uncured coating residue. Thickness measurements were then performed on the substrates to assess the thickness of the APSSQ layers. Finally, AM efficacy measurements were then conducted on the samples according to the Modified EPA Copper Test Protocol.

As shown in FIG. 2, each of the sample groups, A1, A2 and A3, demonstrated log kill levels of 2 or greater. Slight increases in log kill efficacy were recorded for the samples as a function of increasing AM coating thickness. Also apparent in the data is that those samples from the A1 and A2 groups with relatively low AM coating thickness levels of about 100 nm (about 0.1) maintained high AM efficacy levels.

Figure 3:
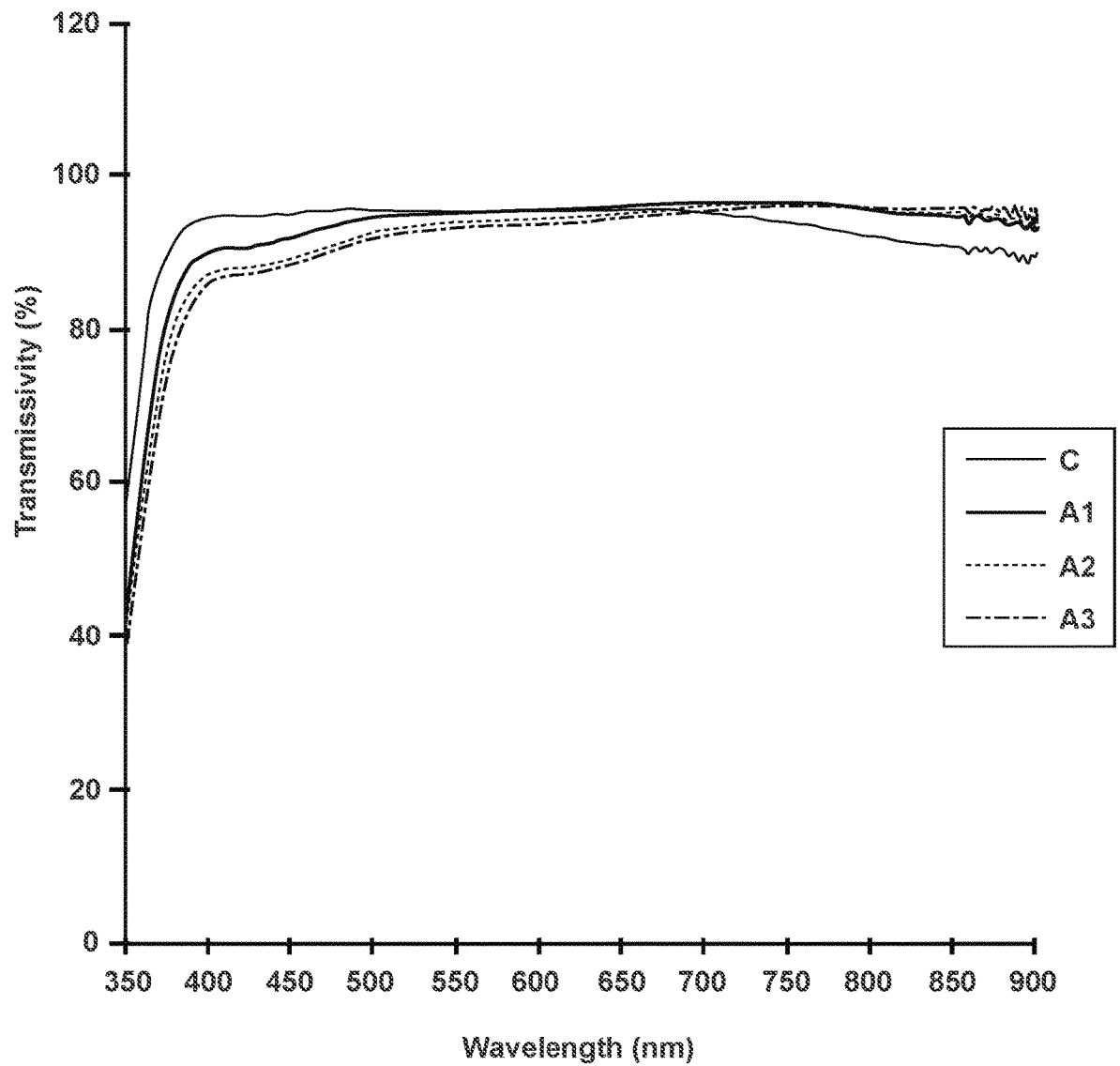
FIG. 3 is a chart of transmissivity spectra for three antimicrobial articles having APSSQ antimicrobial elements of varying thickness and antireflective elements, along with a control article having only an antireflective element.

Referring to FIG. 3, a chart of transmissivity spectra (% transmissivity vs. wavelength (nm)) is provided for three antimicrobial articles having APSSQ antimicrobial elements of varying thickness and antireflective elements (e.g., antireflective elements 120), along with a control article having only an antireflective element. In particular, the samples designated "A1," "A2" and "A3" employed Corning® Gorilla Glass® substrates, an AR element on the substrates according to Table 1 below, and an AM element disposed over the AR element. In particular, the samples of the A1 group were prepared with a 1 wt % APSSQ solution dip-coated at 25 m/m but otherwise according to the conditions specified in connection with FIG. 2 earlier. Similarly, the samples of the A2 and A3 groups were prepared with 1 wt % and 2 wt % APSSQ solutions, respectively, and dip-coated at 50 m/m and 200 m/m, respectively, but in all other respects comparable to the conditions specified in connection with FIG. 2 earlier. In addition, a control sample, "C1," was prepared using a Corning® Gorilla Glass® substrate and the AR element structure according to Table 1 below

TABLE 1

| Layer | Material | Thickness (nm) |
|---|---|---|
| Air medium | Air | N/A |
| AM element | APSSQ | ~50 to ~200 nm |
| 6 | SiO$_2$ | 89 |
| 5 | Nb$_2$O$_5$ | 20 |
| 4 | SiO$_2$ | 4 |
| 3 | Nb$_2$O$_5$ | 99 |
| 2 | SiO$_2$ | 34 |
| 1 | Nb$_2$O$_5$ | 14 |
| Substrate | Corning ® Gorilla Glass ® Glass code 5318 | |

As shown in FIG. 3, the C1 control sample demonstrates the best antireflective properties with transmissivity levels approaching 95% between 350 nm and 900 nm. In contrast, the samples designated A1, A2 and A3 exhibit substantially lower transmissivity levels, particularly at wavelengths between 350 nm and 450 nm. As such, antimicrobial articles with both AM and AR elements can demonstrate good antireflective properties at 450 nm or greater; however, the antireflective properties of these articles can be degraded by the presence of the AM elements at wavelengths of 450 nm or lower. As outlined earlier in the disclosure, the thickness and structures of the AM and AR elements can be further optimized to improve the antireflective properties of the antimicrobial elements.

Figure 4A:
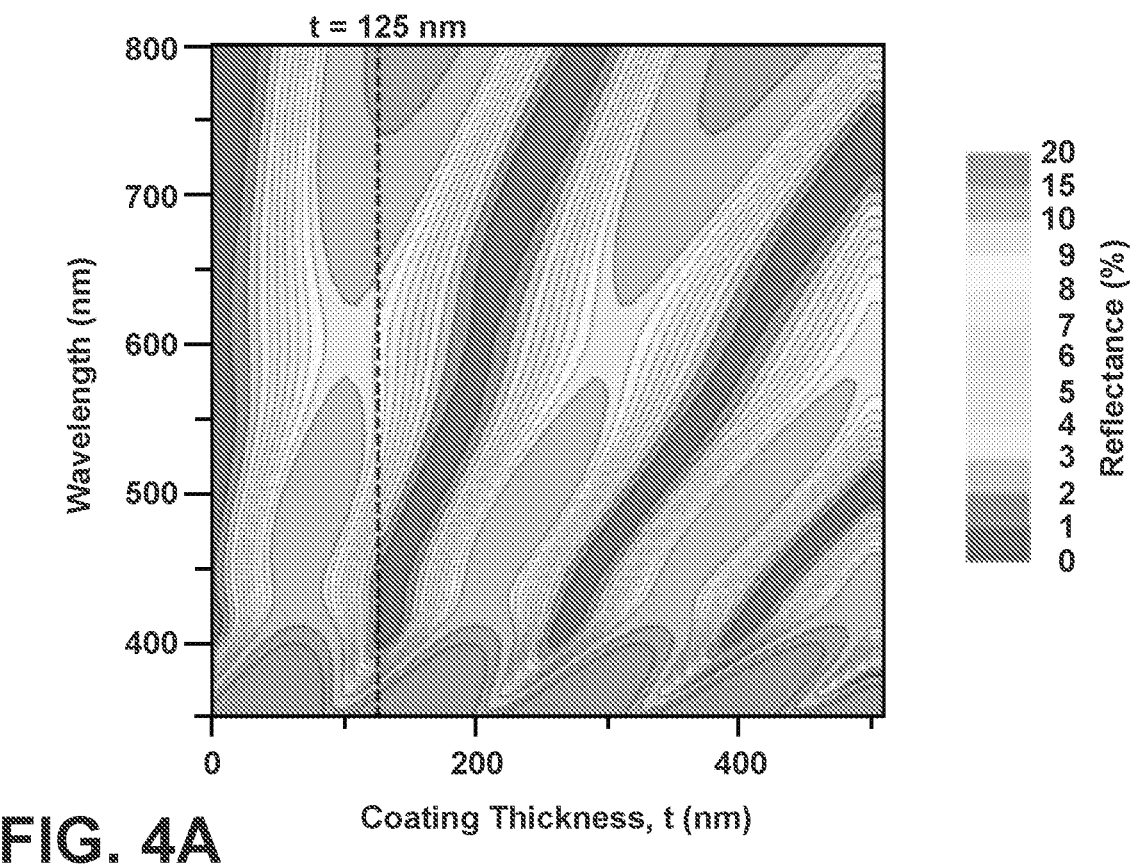
FIG. 4A is a chart of estimated reflectance spectra for antimicrobial articles having APSSQ antimicrobial elements of varying thickness and an antireflective element.

Referring to FIG. 4A, a chart is provided of estimated reflectance spectra between 350 and 800 nm for antimicrobial articles having APSSQ antimicrobial elements of varying thickness and an antireflective element consistent with the AR element structure outlined earlier in Table 1. In making these estimates, it was assumed that the APSSQ material has a glass-like dispersion with a refractive index at about 589 nm of 1.503. In FIG. 4A, the grayscale shading levels correspond to reflectance (%), the y-axis relates to the wavelength (nm) and the x-axis corresponds to the thickness of the AM element comprising an APSSQ layer. Further, it should be noted that the reflectance estimated is the front-surface reflectance, neglecting the back surface reflection of the underlying glass substrate. As demonstrated by FIG. 4A, the calculated data shows that the addition of the antimicrobial element over the antireflective element increases the reflectance levels for various wavelengths within the visible spectrum between about 350 nm and 800 nm. In some aspects, an antimicrobial article having an APSSQ antimicrobial element with a thickness between 150 nm and 250 nm exhibits an estimated reflectance of 4% or less within the visible spectrum (i.e., 425 nm to 725 nm) or a subset of it.

Figure 4B:
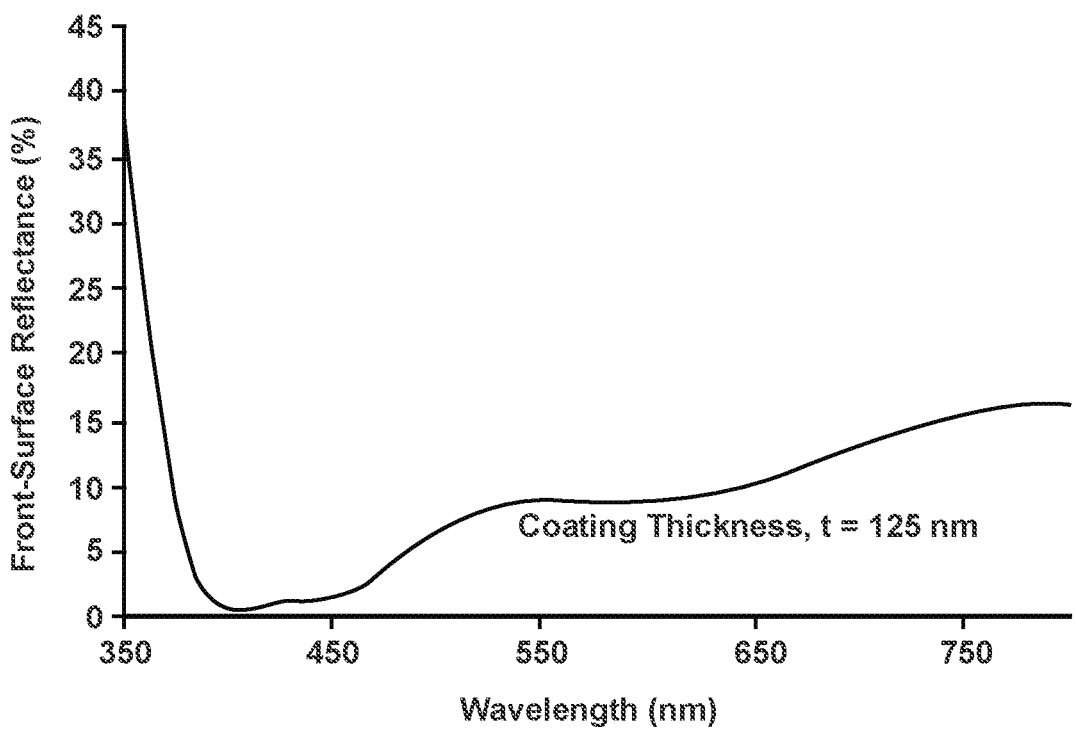
FIG. 4B is a chart of an estimated reflectance spectrum for an antimicrobial article depicted in FIG. 4A with an APSSQ antimicrobial element having a thickness of 125 nm and an antireflective element.

Referring to FIG. 4B, a chart is provided of an estimated reflectance spectrum for an antimicrobial article depicted in FIG. 4A with an APSSQ antimicrobial element having a thickness of 125 nm and an antireflective element. As demonstrated by FIG. 4B, the reflectance is less than 5% from about 400 to about 550 nm, then increases to more than 10% at about 650 nm.

Figure 5:
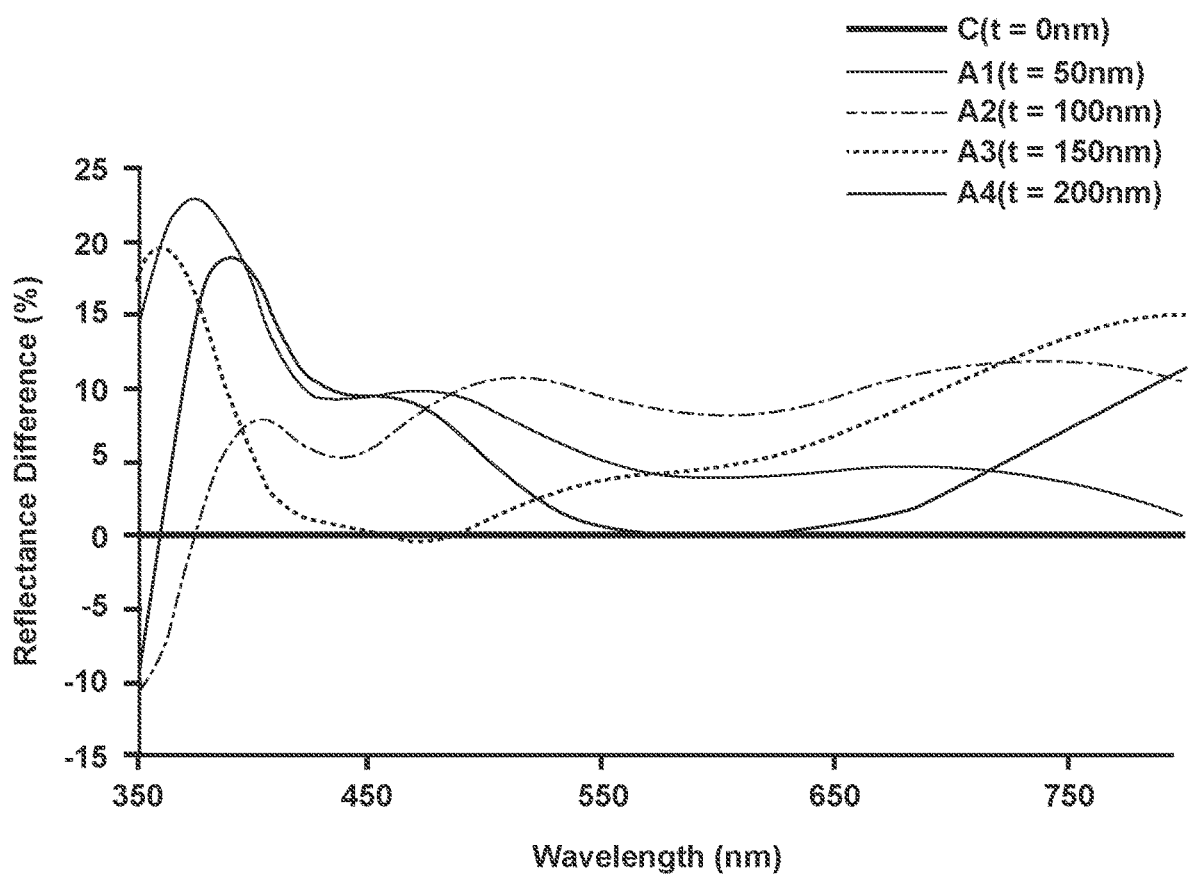
FIG. 5 is a chart of reflectance difference (i.e., reflectance value for a sample minus a control having no antimicrobial element) as a function of wavelength in the visible spectrum for antimicrobial articles having APSSQ antimicrobial elements of varying thickness and an antireflective element.

With regard to FIG. 5, a chart is provided of reflectance difference (i.e., reflectance value for a sample minus a control having no antimicrobial element) as a function of wavelength (nm) in the visible spectrum for antimicrobial articles having APSSQ antimicrobial elements of varying thickness (0 to 200 nm) and an antireflective element with a structure comparable to the AR element structure outlined earlier in Table 1. The samples designated "A1," "A2," "A3" and "A4" have APSSQ antimicrobial elements with thicknesses of 50, 100, 150 and 200 nm, respectively. The control sample, "C", is fabricated without an APSSQ coating. As shown in FIG. 5, the reflectance levels in the antimicrobial articles increase as the APSSQ coating is added (i.e., samples A1-A4) compared to the control sample lacking an APSSQ coating.

Figure 6:
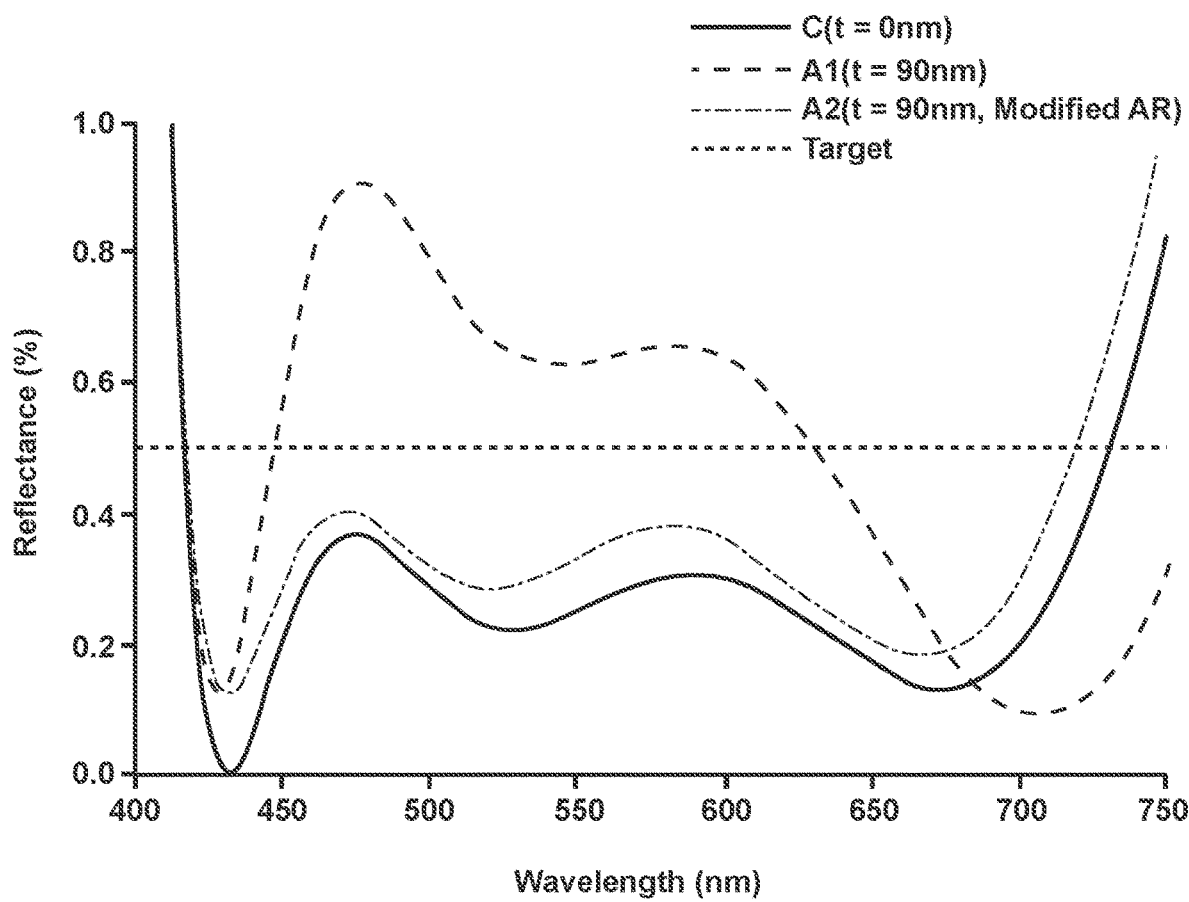
FIG. 6 is a chart of reflectance for antimicrobial articles having an APSSQ antimicrobial element and antireflective elements of varying design.

Nevertheless, significant improvements in the reflectance levels of the antimicrobial articles of the disclosure are possible by modifying the structure of the AR element in view of the structure of the AM element, as depicted in FIG. 6 and Table 2 below. As shown in FIG. 6, for example, a chart is provided of reflectance for antimicrobial articles having an APSSQ antimicrobial element and antireflective elements of varying design. The control sample, "C", is fabricated with an AR element of the structure outlined in Table 1 and no AM element. The target (dashed line) is indicative of a preferred target level of 0.5% or less reflectance within the visible spectrum.

TABLE 2

| Layer | Material | Thickness (nm) |
|---|---|---|
| Air medium | Air | N/A |
| 4 | APSSQ | 87 |
| 3 | $Nb_2O_5$ | 118 |
| 2 | $SiO_2$ | 35 |
| 1 | $Nb_2O_5$ | 13 |
| Substrate | Corning ® Gorilla Glass ® Glass code 5318 | |

Referring again to FIG. 6, the C sample generally exhibits reflectance levels below the target reflectance of 0.5% from 425 nm to about 725 nm. With regard to the sample designated "A1," it possesses an AR element having the structure outlined in Table 1, but modified by substituting an APSSQ layer having a thickness of about 90 nm for the $SiO_2$ "Layer 6" at the top of the article. Here, the A1 series, as expected, is characterized by an increase in reflectivity relative to the control, C1, in a range of about 450 to 675 nm. Nevertheless, the A1 series demonstrates a reflectance of 0.9% or less within the visible spectrum between 425 nm and 725 nm. With regard to the sample designated "A2," it possesses an AR element structure as outlined above in Table 2, along with an APSSQ coating having a thickness of 90 nm. As shown in FIG. 6, the reflectance levels of the A2 samples are very similar to those exhibited by the control, C1, throughout the visible spectrum. Relative to the "A1" sample, the "A2" sample possesses a thinner AR structure with only one $SiO_2$ layer sandwiched by two $Nb_2O_5$ layers. In particular, the A2 series reflects a configuration of an antimicrobial article with an APSSQ layer that replaces a portion of the AR structure employed in the A1 series samples.

The antimicrobial articles of the disclosure possess various advantages over conventional articles. In particular, the antimicrobial articles of the disclosure possess high antimicrobial efficacy with little to no tradeoff in optical properties including but not limited to antireflective performance levels comparable to articles not configured with antimicrobial capability. Another advantage of these articles is that can be configured to provide antimicrobial efficacy with less costly processing approaches (e.g., APSSQ coating deposition) compared to other approaches to developing antimicrobial efficacy (e.g., Ag ion implantation or ion exchange) without a concomitant loss in optical properties. Another advantage of some implementations of the antimicrobial articles of this disclosure is that their AM elements can be processed with a large degree of control, facilitating the selective coverage of certain portions of a substrate and/or AR element depending on the application requirements.

Aspect (1) of this disclosure pertains to an antimicrobial article comprising: an antimicrobial element; and an antireflective element, wherein the article exhibits a reflectance of about 4% or less in the range of about 425 nm to about 725 nm, and further wherein the article exhibits at least a log 2 reduction in a concentration of at least *Staphylococcus aureus, Enterobacter aerogenes*, and *Pseudomonas aeruginosa* bacteria under a Modified EPA Copper Test Protocol.

Aspect (2) of this disclosure pertains to the article of Aspect (1), further comprising: a base substrate, wherein the antireflective element is disposed on the base substrate and the antimicrobial element is disposed on the antireflective element.

Aspect (3) of this disclosure pertains to the article of Aspect (1) or Aspect (2), wherein the substrate comprises a glass, ceramic or glass-ceramic composition.

Aspect (4) of this disclosure pertains to the article of any one Aspect (1) through Aspect (3), wherein the article exhibits a reflectance of about 1% or less in the range of about 425 nm to about 725 nm.

Aspect (5) of this disclosure pertains to the article of any one Aspect (1) through Aspect (4), wherein the antimicrobial element comprises an at least partially cured siloxane comprising organic side chains, wherein at least a portion of the organic side chains comprise protonated amine substituents or amine substituents comprising at least one hydrogen.

Aspect (6) of this disclosure pertains to the article of any one Aspect (1) through Aspect (5), wherein the antimicrobial element has a thickness that ranges from about 10 nm to about 500 nm.

Aspect (7) of this disclosure pertains to the article of any one Aspect (1) through Aspect (6), wherein the antimicrobial element has a thickness that ranges from about 50 nm to about 250 nm.

Aspect (8) of this disclosure pertains to the article of any one Aspect (1) through Aspect (7), wherein the antimicrobial element has a thickness that ranges from about 75 nm to about 150 nm.

Aspect (9) of this disclosure pertains to the article of any one Aspect (1) through Aspect (8), wherein the antireflective element comprises a plurality of alternating layers of low and high refractive index materials.

Aspect (10) of this disclosure pertains to the article of any one Aspect (1) through Aspect (9), wherein the antireflective element comprises a first layer comprising $Nb_2O_5$ disposed on the substrate, a second layer comprising $SiO_2$ disposed on the second layer, and a third layer comprising $Nb_2O_5$ disposed on the second layer.

Aspect (11) of this disclosure pertains to the article of Aspect (10), wherein the first layer has a thickness that ranges from 10 to 20 nm, the second layer has a thickness that ranges from 30 to 40 nm, and the third layer has a thickness that ranges from 105 nm to 130 nm, and further wherein the antimicrobial element has a thickness that ranges from 80 nm to 95 nm.

Aspect (12) of this disclosure pertains to the article of any one Aspect (1) through Aspect (11), wherein the antimicrobial element comprises a silver, copper or zinc ion-exchanged silicate, alkali silicate or alkali borosilicate layer.

Aspect (13) of this disclosure pertains to an antimicrobial article comprising: an antimicrobial element with an antimicrobial element thickness that ranges from about 50 to about 200 nm, an antimicrobial element optical thickness and an antimicrobial element refractive index; and an antireflective element with an antireflective element thickness, an antireflective element optical thickness and an antireflective element refractive index, wherein the article exhibits a reflectance of about 4% or less in the range of about 425 nm to about 725 nm, and further wherein the sum of the antireflective element optical thickness and the antimicrobial element optical thickness is a constant, the antireflective element optical thickness is given by the antireflective element thickness times the antireflective element refractive index, and the antimicrobial element optical thickness is given by the antimicrobial element thickness times the antimicrobial element refractive index.

Aspect (14) of this disclosure pertains to the article of Aspect (13), further comprising: a base substrate, wherein the antireflective element is disposed on the base substrate and the antimicrobial element is disposed on the antireflective element.

Aspect (15) of this disclosure pertains to the article Aspect (14), wherein the substrate comprises a glass, ceramic or glass-ceramic composition.

Aspect (16) of this disclosure pertains to the article of any one Aspect (13) through Aspect (15), wherein the article exhibits a reflectance of about 1% or less in the range of about 425 nm to about 725 nm.

Aspect (17) of this disclosure pertains to the article of any one Aspect (13) through Aspect (16), wherein the antimicrobial element comprises an at least partially cured siloxane comprising organic side chains, wherein at least a portion of the organic side chains comprise protonated amine substituents or amine substituents comprising at least one hydrogen.

Aspect (18) of this disclosure pertains to the article of any one Aspect (13) through Aspect (17), wherein the antimicrobial element has a thickness that ranges from about 75 nm to about 150 nm.

Aspect (19) of this disclosure pertains to the article of any one Aspect (13) through Aspect (18), wherein the antireflective element comprises a plurality of alternating layers of low and high refractive index materials.

Aspect (20) of this disclosure pertains to the article of any one Aspect (13) through Aspect (19), wherein the antireflective element comprises a first layer comprising $Nb_2O_5$ disposed on the substrate, a second layer comprising $SiO_2$ disposed on the second layer, and a third layer comprising $Nb_2O_5$ disposed on the second layer.

Aspect (21) of this disclosure pertains to the article of Aspect (20), wherein the first layer has a thickness that ranges from 10 to 20 nm, the second layer has a thickness that ranges from 30 to 40 nm, and the third layer has a thickness that ranges from 105 nm to 130 nm, and further wherein the antimicrobial element has a thickness that ranges from 80 nm to 95 nm.

Aspect (22) of this disclosure pertains to the article of any one Aspect (13) through Aspect (21), wherein the article exhibits at least a log 2 reduction in a concentration of at least *Staphylococcus aureus, Enterobacter aerogenes*, and *Pseudomonas aeruginosa* bacteria under a Modified EPA Copper Test Protocol.

Aspect (23) of this disclosure pertains to the article of any one Aspect (13) through Aspect (22), wherein the antimicrobial element comprises a silver, copper or zinc ion-exchanged silicate, alkali silicate or alkali borosilicate layer.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

We claim:

1. An antimicrobial article comprising:
an antimicrobial element; and
an antireflective element,
wherein the article exhibits a reflectance of about 4% or less in the range of about 425 nm to about 725 nm, and
wherein the article exhibits at least a log 2 reduction in a concentration of at least *Staphylococcus aureus, Enterobacter aerogenes*, and *Pseudomonas aeruginosa* bacteria under a Modified EPA Copper Test Protocol,
wherein the antimicrobial element is derived from an at least partially cured siloxane comprising organic side chains, wherein at least a portion of the organic side chains comprises protonated amine substituents or amine substituents comprising at least one hydrogen,
wherein the at least partially cured siloxane is a partially-cured aminopropyl silsesquioxane ("APSSQ"), and
further wherein the antimicrobial element has a thickness that ranges from about 50 nm to about 250 nm.

2. The article of claim 1, further comprising:
a base substrate, wherein the antireflective element is disposed on the base substrate and the antimicrobial element is disposed on the antireflective element.

3. The article of claim 2, wherein the base substrate comprises a glass, ceramic or glass-ceramic composition.

4. The article of claim 1, wherein the article exhibits a reflectance of about 1% or less in the range of about 425 nm to about 725 nm.

5. The article of claim 1, wherein the antimicrobial element has a thickness that ranges from about 75 nm to about 150 nm.

6. The article of claim 1, wherein the antireflective element comprises a plurality of alternating layers selected from the group consisting of $Al_2O_3$, $AlO_xN_y$, $SiO_xN_y$, $SiAlO_xN_y$, $TiO_2$, $Ta_2O_5$, $MgF_2$, $LaF_2$, $AlF_3$, $HfO_2$, $Y_2O_3$, ZnO and $ZrO_2$.

7. The article of claim 2, wherein the antireflective element comprises a first layer comprising $Nb_2O_5$ disposed on the base substrate, a second layer comprising SiO2 disposed on the second layer, and a third layer comprising $Nb_2O_5$ disposed on the second layer.

8. The article of claim 7, wherein the first layer has a thickness that ranges from 10 to 20 nm, the second layer has a thickness that ranges from 30 to 40 nm, and the third layer has a thickness that ranges from 105 nm to 130 nm, and further wherein the antimicrobial element has a thickness that ranges from 80 nm to 95 nm.

9. An antimicrobial article comprising:
an antimicrobial element with an antimicrobial element thickness that ranges from about 50 to about 200 nm, an antimicrobial element optical thickness and an antimicrobial element refractive index; and
an antireflective element with an antireflective element thickness, an antireflective element optical thickness and an antireflective element refractive index,
wherein the article exhibits a reflectance of about 4% or less in the range of about 425 nm to about 725 nm,
wherein the sum of the antireflective element optical thickness and the antimicrobial element optical thickness is a constant, the antireflective element optical thickness is given by the antireflective element thickness times the antireflective element refractive index, and the antimicrobial element optical thickness is given by the antimicrobial element thickness times the antimicrobial element refractive index, wherein the article exhibits at least a log 2 reduction in a concentration of at least *Staphylococcus aureus, Enterobacter aerogenes,* and *Pseudomonas aeruginosa* bacteria under a Modified EPA Copper Test Protocol, wherein the antimicrobial element is derived from an at least partially cured siloxane comprising organic side chains, wherein at least a portion of the organic side chains comprises protonated amine substituents or amine substituents comprising at least one hydrogen, and further wherein the at least partially cured siloxane is a partially-cured APSSQ.

10. The article of claim 9, further comprising:
a base substrate, wherein the antireflective element is disposed on the base substrate and the antimicrobial element is disposed on the antireflective element.

11. The article of claim 10, wherein the base substrate comprises a glass, ceramic or glass-ceramic composition.

12. The article of claim 9, wherein the article exhibits a reflectance of about 1% or less in the range of about 425 nm to about 725 nm.

13. The article of claim 9, wherein the antimicrobial element has a thickness that ranges from about 75 nm to about 150 nm.

14. The article of claim 9, wherein the antireflective element comprises a plurality of alternating layers selected from the group consisting of $Al_2O_3$, $AlO_xN_y$, $SiO_xN_y$, $SiAlO_xN_y$, $TiO_2$, $Ta_2O_5$, $MgF_2$, $LaF_2$, $AlF_3$, $HfO_2$, $Y_2O_3$, ZnO and $ZrO_2$.

* * * * *

UNITED STATES PATENT AND TRADEMARK OFFICE
CERTIFICATE OF CORRECTION

PATENT NO. : 10,787,386 B2
APPLICATION NO. : 15/756647
DATED : September 29, 2020
INVENTOR(S) : Karl William Koch, III et al.

Page 1 of 1

It is certified that error appears in the above-identified patent and that said Letters Patent is hereby corrected as shown below:

In the Claims

In Column 22, Line 10, Claim 1, delete "nm, and" and insert -- nm, --, therefor.

In Column 22, Line 43, Claim 7, delete "SiO2" and insert -- $SiO_2$ --, therefor.

In Column 22, Line 47, Claim 8, delete "10 to 20 nm" and insert -- 10 nm to 20 nm --, therefor.

In Column 22, Line 48, Claim 8, delete "30 to 40 nm" and insert -- 30 nm to 40 nm --, therefor.

In Column 22, Line 54, Claim 9, delete "50 to about 200 nm" and insert -- 50 nm to about 200 nm --, therefor.

In Column 23, Line 8, Claim 9, delete "partially cured" and insert -- partially-cured --, therefor.

In Column 23, Line 13, Claim 9, delete "partially cured" and insert -- partially-cured --, therefor.

In Column 23, Line 29, Claim 14, delete "$SiO_xN_y$," and insert -- $SiO_xN_y$, --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*